Figure 2:
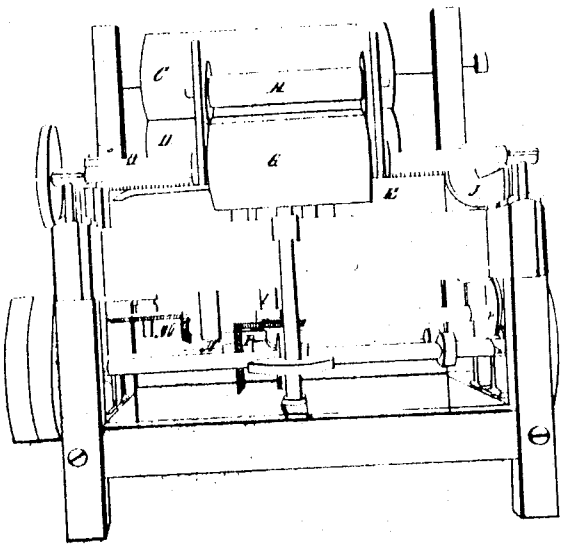
Figure 1:
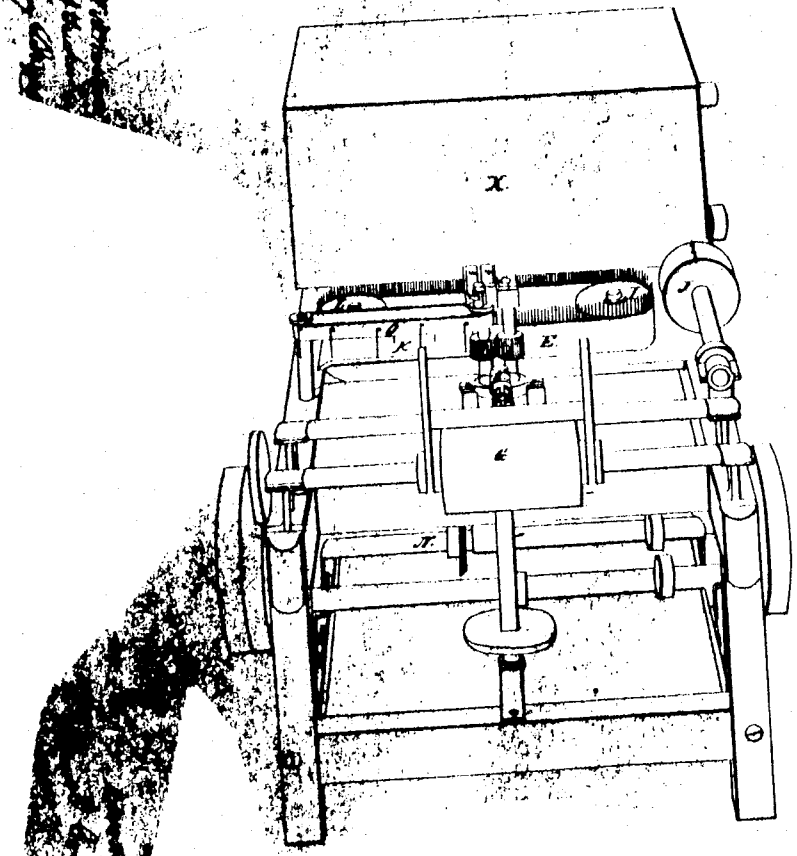

Sheet 1-3 Sheets.

S. Couillard, Jr.

Wool Combing Mach.

Patented Jul. 7, 1835.

BEST AVAILABLE COPY

8952 X

Witnesses
Attest
Hay Clay

Inventor
S. Couillard Jr.

BEST AVAILABLE COPY
S. Couillard, Jr.
Wool Combing Mach.
8,952 X
Patented Jul. 7, 1835.
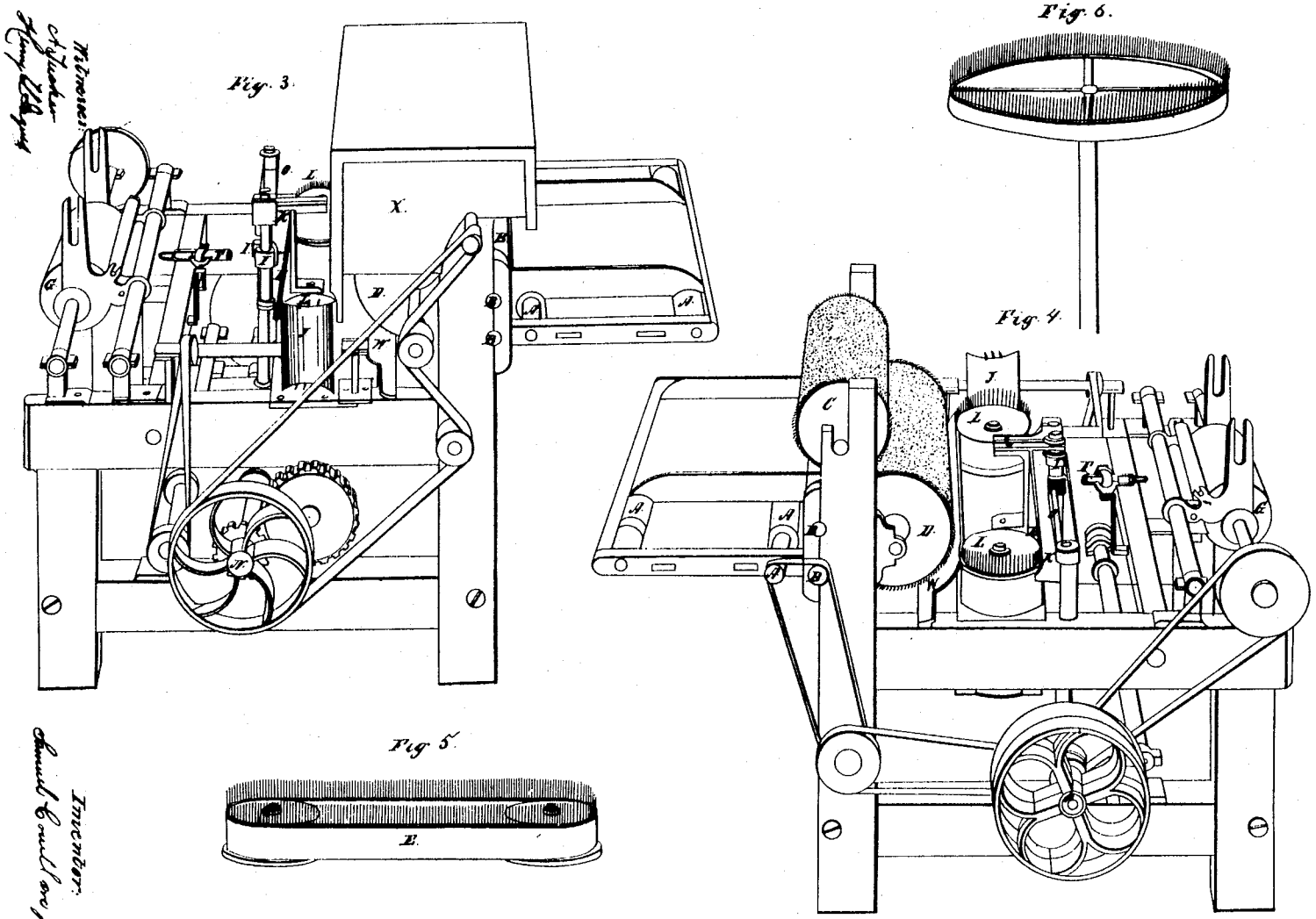
N. PETERS, PHOTO-LITHOGRAPHER, WASHINGTON, D. C.

BEST AVAILABLE COPY
S. Couillard, Jr.
Sheet 3 - 3 Sheets.
Wool Combing Mach.
8,952 x
Patented Jul. 7, 1835.
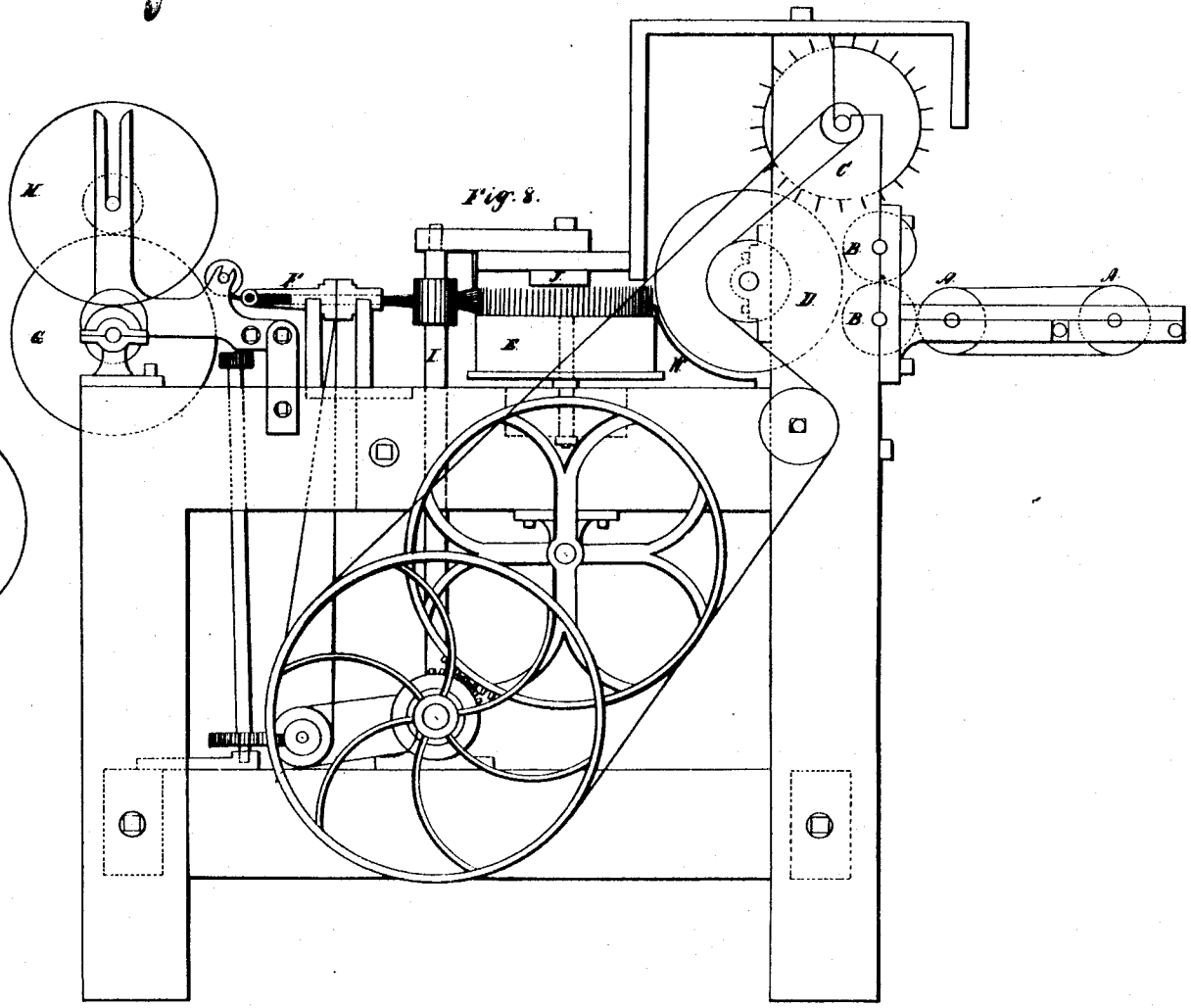
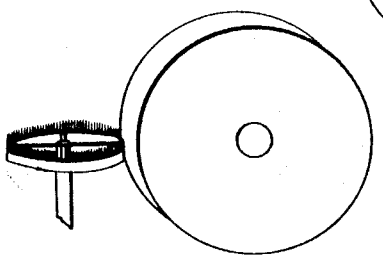
Witnesses:
A. Tucker
H. Humphreys
Inventor:
Samuel Couillard Jr.
N. PETERS, PHOTO-LITHOGRAPHER, WASHINGTON, D. C.

MISSING PAGE TEMPORARY NOTICE

PATENT # X8952 FOR ISSUE DATE 7-7-35

HAS BEEN SCANNED, BUT WITH MISSING PAGE(S). UPON RECEIVING OF MISSING PAGE(S), THE ENTIRE DOCUMENT WILL BE RESCANNED. PLEASE CALL THE OFFICE OF DATA BASE ADMINISTRATION AT (703) 308-0555 IF YOU HAVE A QUESTION.

THIS NOTICE IS FOR THE MISSING PAGE CONTAINING:

all text